Jan. 13, 1970  R. T. ELLIS ET AL  3,489,372
SATELLITE SPIN CONTROL SYSTEM
Filed July 31, 1967  4 Sheets-Sheet 1

INVENTORS
RICHARD T. ELLIS
ROBERT E. FISCHELL

BY

ATTORNEY

United States Patent Office 3,489,372
Patented Jan. 13, 1970

3,489,372
SATELLITE SPIN CONTROL SYSTEM
Richard T. Ellis, Clarksville, and Robert E. Fischell,
Silver Spring, Md., assignors to the United States
of America as represented by the Secretary of the
Navy
Continuation-in-part of application Ser. No. 597,137,
Nov. 25, 1966. This application July 31, 1967, Ser.
No. 657,735
Int. Cl. B64g 1/10
U.S. Cl. 244—1                                     23 Claims

ABSTRACT OF THE DISCLOSURE

There is disclosed a spin rate control for a satellite wherein a magnetic dipole moment is generated in the satellite X–Y plane and properly phased with respect to the earth's magnetic field. This moment will produce a torque to increase or decrease the spin rate. The sense of the torque may be selected by command. There is further disclosed a satellite spin axis attitude control whereby a magnetic dipole moment is produced within the satellite along the spin axis Z which reacts with the earth's magnetic field to produce spin axis precession.

---

This application is a continuation-in-part of application Ser. No. 597,137, filed Nov. 25, 1966, now abandoned, for a Satellite Spin Control.

BACKGROUND OF THE INVENTION

The present invention relates in general to satellite control and more particularly to spin and attitude control for earth satellites.

One of the simplest and most reliable attitude control systems for earth satellites consists of fixing the position of one satellite axis by means of a gyroscopic torque resulting from spin about that axis. Among the satellites that have been stabilized in this manner are Vanguard, several Explorer satellites, all Tiros satellites, Alouette and Syncom, to name just a few. The earliest satellites merely allowed the satellite to spin because it was more convenient than de-spinning them, and no attempt was made to orient the spin axis after separation from the launch vehicle. However, as space technology developed, two significant improvements have been required for spin controlled satellites: Control of spin rate, and control of spin axis orientation.

In the field of satellite control, it has lately been the general practice to employ attitude control devices to orient the spin axis. Although such devices have served the purpose, they have not proved entirely satisfactory under all conditions of service since they provided no way to control the rate of spin and de-spin about the spin axis.

The need for both spin and de-spin control has long been recognized. The present invention fulfilled this need.

SUMMARY OF THE INVENTION

The general purpose of this invention is to provide a satellite control system which embraces all of the advantages of similarly employed devices and possesses none of the afore-described disadvantages. To attain this, the present invention contemplates a unique spin-rate control system consisting of a 2-axis vector magnetometer each axis mounted perpendicular to the satellite's spin axis and perpendicular to each other. The magnetometer output is fed through conventional electronics and the magnetometer electronics output is then amplified and fed into the coil of an electromagnet. The satellite rotates about its Z axis, the X-axis magnetometer senses the earth's magnetic field in the X direction, and energizes an electromagnet mounted along the Y axis. To provide redundancy and faster spin rate control, a Y-axis vector magnetometer also energizes an electromagnet along the X axis. As the satellite spins, the system will provide an essentially constant amplitude magnetic dipole moment that is always perpendicular to the component of the earth's magnetic field in the X–Y plane of the satellite. The resulting torque can be used to cause the satellite to spin faster or slower, depending upon whether the resulting dipole moment leads or lags the component of the earth's magnetic field in the X–Y plane.

It is therefore an object of the present invention to provide a means for controlling the spin rate of earth satellites in orbit.

Another object of the invention is to provide a device of simple construction for controlling the spin and de-spin of an earth satellite in orbit.

A fourth object of the invention is to provide a means for controlling the attitude of earth's satellite in orbit.

Still another object is to provide a simple magnetic device which will maintain a satellite in a fixed orientation in the earth's magnetic field regardless of short term variations in the magnetic field.

Other objects and many of the attendant advantages of this invention will be readily appreciated as the same becomes better understood by reference to the following detailed description when considered in connection with the accompanying drawings in which like reference numerals designate like parts throughout the figures thereof.

DESCRIPTION OF THE PREFERRED EMBODIMENTS

Figure 1:
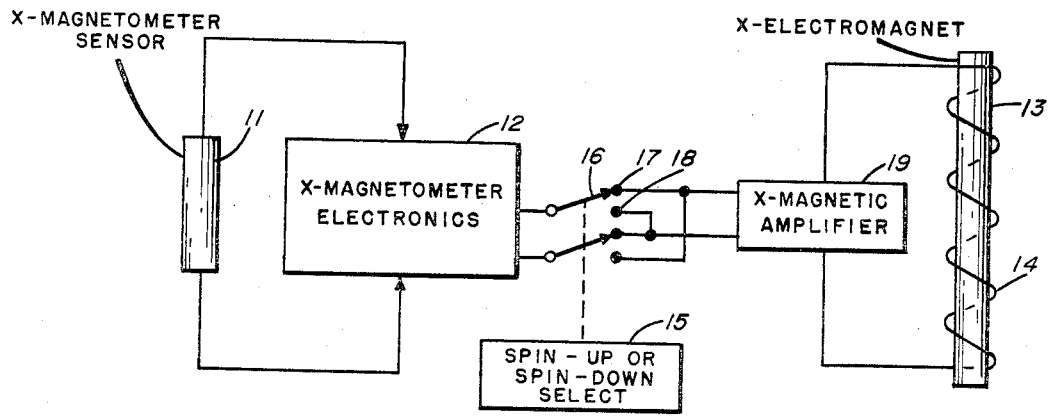
FIG. 1 illustrates the X axis embodiment of the simplest form of a spin-despin system.

Referring now to the drawings, wherein like reference characters designate like or corresponding parts, and prime reference characters designate Y-axis configurations which are identical to the X-axis configuration throughout the several views, there is shown in FIG. 1 a simple embodiment of the instant invention. The torque produced is governed by the equation $$T_z = M_s H_{xy} \sin \theta$$

where $M_s$ is the dipole moment in the satellite, $H_{xy}$ is the component of the earth's magnetic field in the X–Y plane and $\theta$ is the angle between the satellite dipole $M_s$ and the component of the earth's magnetic field in the X–Y plane, $H_{xy}$. Therefore, to control the spin or de-spin of the satellite, assuming that the spin axis corresponds to the Z axis, the embodiment shown in FIG. 1 would be used on both the X and Y axes. In this system, a vector magnetometer system consisting of a vector magnetometer sensor 11 and associated electronics 12, are used to sense the component of the earth's magnetic field $H_x$ along the X axis of the satellite. The output of the conventional X magnetometer electronics 12 is amplified through amplifier 19 and fed into a winding of an electromagnet 13 with coils 14 along the satellite's X axis producing a satellite moment $M_x$, the effect of which is similar to but considerably more effective than a permeable rod rotating in a magnetic field such as disclosed in Patent No. 3,114,518. The torque produced is the result of the angular phase shift between $M_x$ and $H_x$. This phase shift, $\theta$ in FIG. 1, is the result of the direction of the earth's magnetic field at the satellite location with respect to the $x$ axis and the hysteresis that is present in the electromagnet and in the magnetometer electronics. Spin-up or spin-down select 15 and associated switch blade 16 control the direction of spin. For spin-up, switch blade 16 is connected to contact 17 causing the satellite moment $M_x$ to be in a direction such as to aid the natural rotation of the satellite. For spin-down control, switch blade 16 is connected to contact 18 which reverses the moment $M_x$ so that it then acts to damp the natural rotation of the satellite. While FIG. 1 discloses only the X axis configuration, it is to be remembered that in a similar manner there may also be a Y-axis magnetometer output which is amplified and fed to a Y axis electromagnet producing a satellite dipole $M_y$ which reacts with the component of the earth's magnetic field $H_{xy}$ to also produce a torque about the Z axis.

Figure 2:
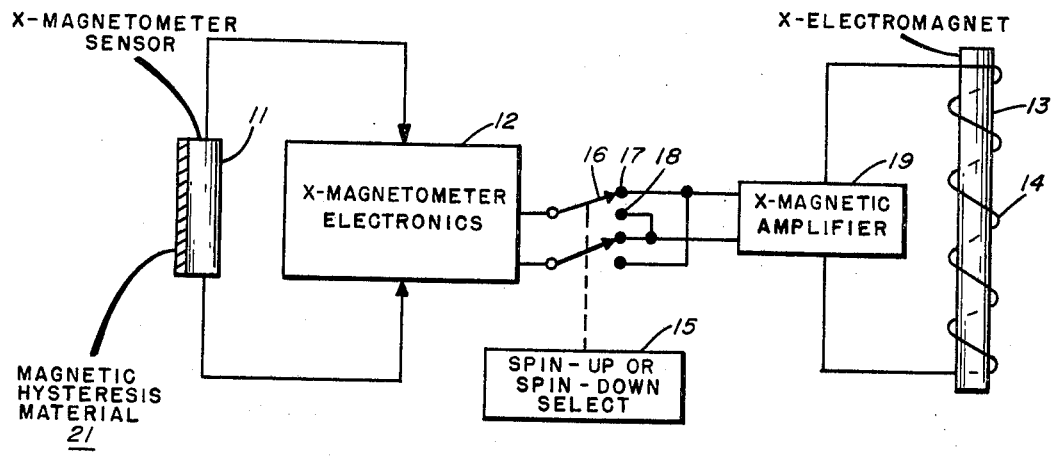
FIG. 2 is an alternate embodiment of the invention shown in FIG. 1.

FIG. 2 is identical to FIG. 1 except that X magnometer sensor 11 includes a magnetic hysteresis material 21. This hysteresis material may be of the type disclosed in Patent No. 3,114,518 or any other material of high hysteresis loss that is well-known in the art. An additional damping effect results because of the hysteresis material and the magnetic field induced in the material by the component of the earth's magnetic field normal to the direction of spin. the induced magnetic field adds strength to the satellite moment $M_x$ and thereby improves the spin rate control capability of the system.

Figure 3:
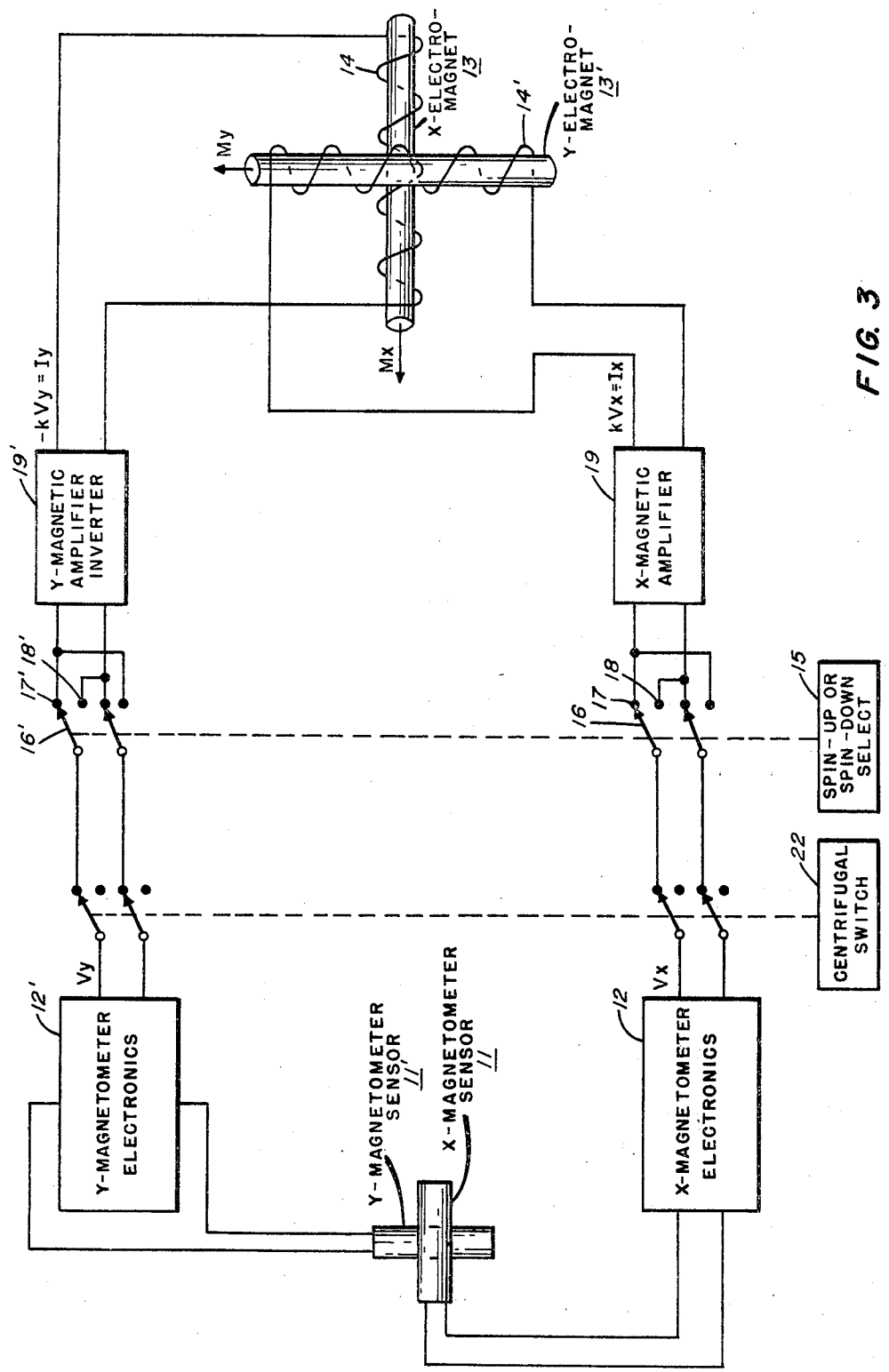
FIG. 3 is a complete schematic diagram of another embodiment of this invention.

FIG. 3, the preferred embodiment of the invention, utilizes the principles set forth in FIGS. 1 and 2. There is shown X and Y magnetometer sensors 11 and 11', respectively, and associated conventional magnetometer electronics 12 and 12'. The magnetometer output voltages $V_x$ and $V_y$ are proportional to the earth's magnetic field components in the X-Y plane. These voltages are amplified by amplifiers 19 and 19', respectively, to produce currents $i_x$ and $i_y$, proportional to the input voltages. It was shown, in FIGS. 1 and 2, that phase shift is necessary. For better results, it has been found that a maximum 90° phase shift between the satellite moment $M_s$ and the earth's magnetic field $H_{xy}$ can be introduced by feeding the current $i_x$ to the Y electromagnet and the negative of the current $i_y$ to the X electromagnet. The cross-over of direction current to the Y electromagnet and the Y direction current to the X electromagnet with a sign reversal from Y to X, produces a phase shift of 90° of the net magnetic dipole of the electromagnet relative to the earth's magnetic field in the X-Y plane. Reaction of this dipole moment, $M_s$, with the earth field component in the X-y plane, $H_{xy}$, produces a torque about the Z axis, $T_z$, the torque can be given by the following equation:

$$T_z = M_s H_{xy} \sin \theta$$

where $\theta$ is the angle between the magnetic moment $M_s$ and $H_{xy}$. This angle will be 90° nominally but hysteresis in the electromagnet cores, and nonlinearity in the amplifier will cause some variations from 90°. The torque $T_z$ will cause the satellite to accelerate in angular velocity about the Z axis, $\omega_z$, according to $\omega_z = T_z/I_z$, where $I_z$ is the moment of inertia about the Z axis.

The sense of this torque can be controlled by using the spin-up or spin-down select 15 and thereby reversing the polarity through the amplifiers 19 and 19' by moving switch blade 16 and 16' to opposite contacts. Conceivably, the acceleration process could continue to a very high spin velocity. Therefore, a centrifugal switch 22 is included to turn the spin system off when an exceptional spin velocity is reached.

Figure 4:
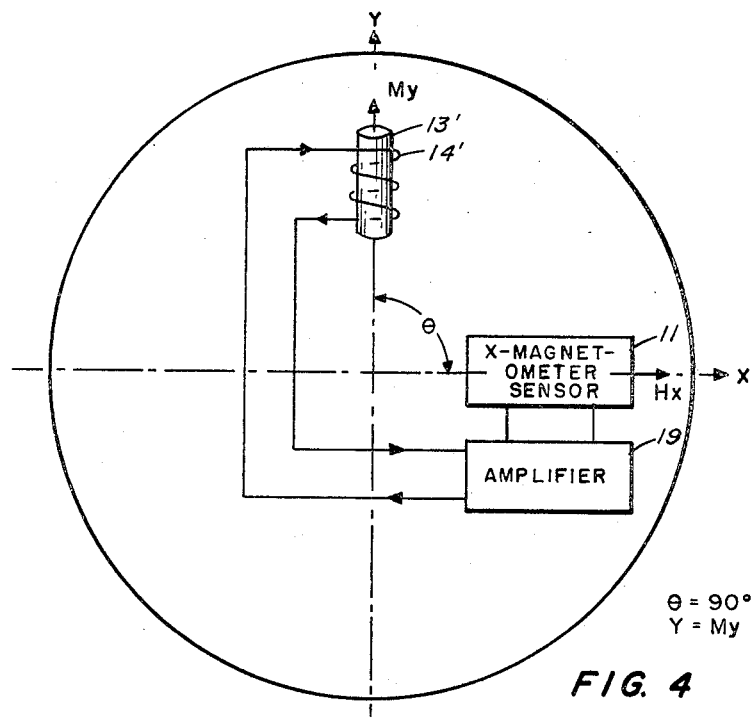
FIGS. 4 and 5 are vector diagrams illustrating the operation of the embodiment shown in FIG. 3.
Figure 5:
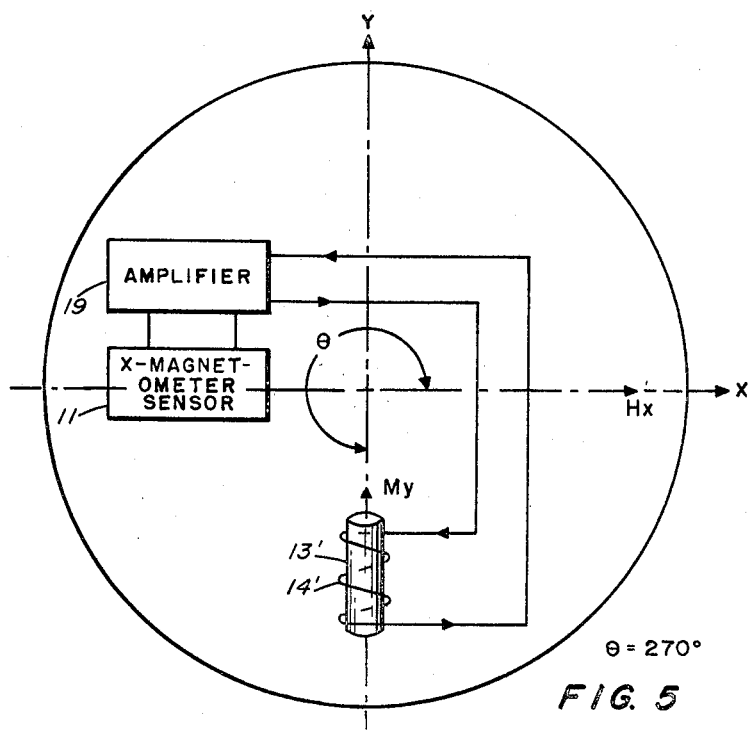

The vector diagrams in FIGS. 4 and 5 show only the X magnetometer sensor and the Y axis electromagnet. It is to be understood that like sensors appear on the Y axis and like electromagnets on the X axis. X magnetometer sensor 11 gives out a signal in proper phase relationship to $H_{xy}$, which is fed to the Y electromagnet coil 13' producing a moment in the Y direction $M_y$. $M_y$ is 90° out of phase from the component of the earth's magnetic field $H_x$ thereby producing a torque in the Z direction (perpendicular to the plane of the paper). In FIG. 5 the satellite has rotated 180° and $\ominus$ is equal to 270°. It can again be shown that the component of the earth's magnetic field $H_x$ remains in the same direction as previously while the Y axis electromagnet has shifted 180°. However, the magnetic moment in the Y direction still remains in the positive direction thereby continuing the torque in the Z direction as previously produced, and thereby further increasing the amount of spin. It can therefore be shown that the continued rotation of the satellite continues to produce a torque in the same direction enhancing the spin. Combining both X axis and Y axis sensors with their respective electromagnets, the sensors then react to the earth's magnetic field $H_{xy}$, (the projection of the earth's magnetic field in the satellite's X-Y plane) and produce a magnetic dipole $M_s$ in the satellite that is always essentially perpendicular to the earth's magnetic field. Using the magnetometer voltage $V_x$ and $V_y$ to energize the electromagnets results in the magnetic dipole moment $M_s$ always being perpendicular to the component of the earth's magnetic field in the X-Y plane, $H_{xy}$, and thereby making $\sin \ominus = 1$. An external voltage being applied to the electromagnets would not accomplish this result since the phase difference between the voltage and the earth's magnetic field could not be controlled. Therefore, the total torque then acting on the satellite about its Z axis is given by $T_z = M_s H_{xy}$, where $M_s$ is the satellite dipole moment and $H_{xy}$ is the projection of the earth's magnetic field in the satellite's X-Y plane. Depending on which way the satellite is rotating, it will either cause the satellite to increase or decrease its spin rate. If de-spin results when spin-up is desired, reversing the polarity of both the X and Y amplifiers by use of switch control 15 will accomplish this objective.

Figure 6:
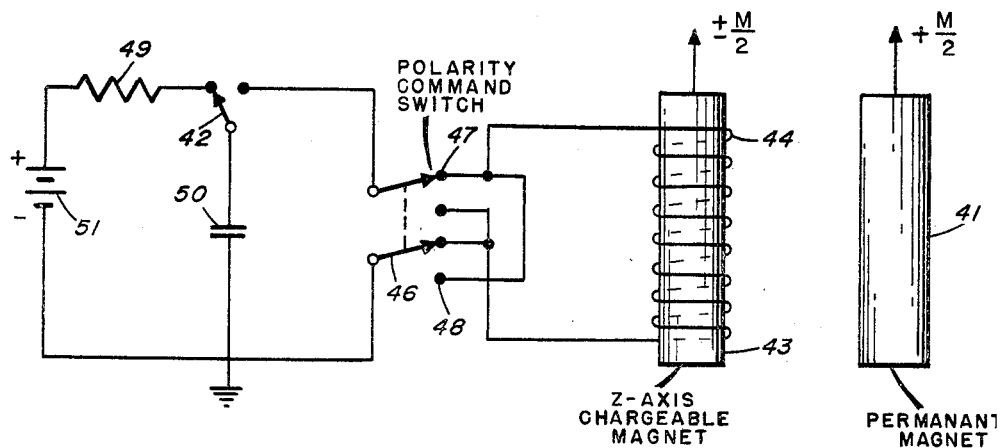
FIG. 6 is a diagrammatic showing of an embodiment of the invention operable to produce spin axis precession.

When the spin system is in operation, there is also a torque acting on the satellite that tends to make it precess. This torque is given by $\vec{T} = \vec{M_s} \times \vec{H}$ where H is the total magnetic field vector and $M_s$ is the satellite magnetic dipole moment. If the satellite is spinning rapidly, and if the product $\vec{M_s} \times \vec{H}$ is reasonably small, the induced precession can be kept negligibly small. However, for best results, it is necessary that the satellite spin axis be orthogonal to the orbital plane and therefore a precess control circuit is included in the system. This is shown in FIG. 6. For magnetic spin axis control it is necessary to have a reasonably good knowledge of the satellite's orbit, and a moderately accurate idea of the magnitude and direction of the earth's magnetic field at the position of the satellite.

Figure 7:
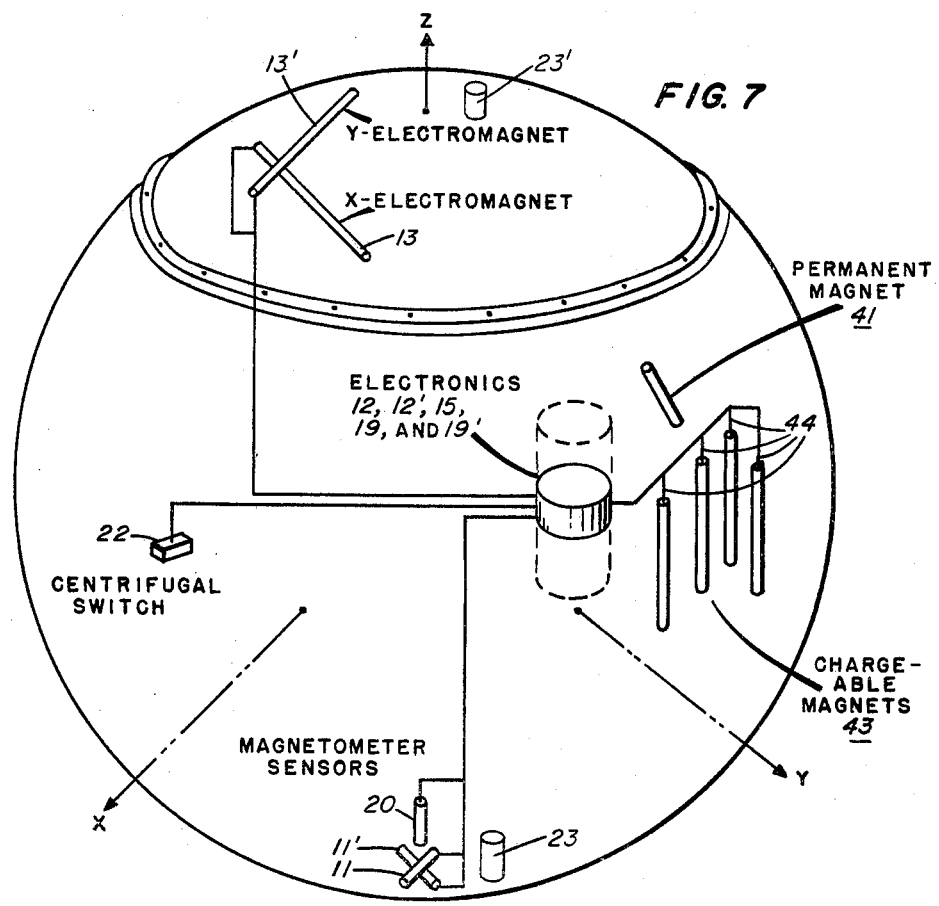
FIG. 7 is a diagrammatic showing of the physical positioning, in a satellite, of all the components of the instant invention.

For spin axis orientation control it is necessary to provide the satellite with a nutation damper, shown in FIG. 7 as 23 and 23', so that the motion other than about the Z axis will be damped out. Any of a number of well-known nutation dampers may be used. However, the instant embodiment contemplates the use of a nutation damper consisting of two circular aluminum tubes, each containing a ball that is free to roll inside the tube. These tubes are moved as far away as possible from the satellite center of mass. The center of curvature of the tubes is located two inches from the satellite Z-axis. When the satellite has either the X-axis angular velocity not equal to zero or the Y-axis angular velocity not equal to zero, the ball in each tube will roll back and forth from its equilibrium (center) position. When the ball moves, six small permanent magnets inside the sphere cause eddy currents in the aluminum tubes, thereby dissipating the precession energy of the satellite. The magnets in each ball are arranged so that they have a zero net dipole moment so that they will not perturb the spin axis orientation or cause erroneous reading of the magnetometers. It is also necessary that the satellite spin moment of inertia, $I_z$, be somewhat larger than the other principal moments of inertia, $I_x$ and $I_y$, so that the satellite will stabilize with its spin about the Z axis. The satellite utilizes a system of chargeable magnets along the Z axis of the satellite to produce a magnetic dipole moment which results in precession of the satellite's spin axis so that it can be oriented perpendicular to the orbital plane. Magnetometer sensor 20 of FIG. 7, oriented along the Z axis, senses according to principles well known in the art when precess control is necessary.

In FIG. 6, a source of voltage 51 causes a capacitor 50 to be charged and then by radio command 42 discharged through an electrical winding 44 wrapped around a permanent magnet material 43, along the Z axis. When the polarity switch 46 is in the "add" position 47, a dipole moment equal to $+M/2$ is produced in the chargeable magnet. If the polarity switch is reversed, position 48, and the capacitor is charged and then discharged through the windings; a dipole moment $-M/2$ is produced. If the satellite also contains a permanent dipole moment 41 of magnitude $+M/2$ in the Z direction, the satellite can readily obtain two magnetic states, namely $M_z = +M$ and $M_z = 0$. The state of $+m$ may be used to precess the satellite's spin axis; the state $M_z = 0$ is used when no further Z axis reorientation is desired.

Instead of using a chargeable and a permanent magnet an alternative embodiment would only use a chargeable magnet that can be magnetized to any value between $-M \leq M_z \leq +M$. However, in this embodiment there will always be a precess control force since there is no state where $M_z = 0$.

FIG. 7 is a diagrammatic arrangement of one possible physical disposition, in the satellite, of all the elements shown in FIGS. 3 and 6. However, other suitable arrangements could be used.

It should be understood, of course, that the foregoing disclosure relates only to a preferred embodiment of the invention and that numerous modifications or alterations may be made therein without departing from the spirit and scope of the invention. Having thus described the invention, what is claimed is:

1. A spin and attitude control system for a spinning space vehicle comprising:
   a magnetometer system and first electromagnet means responsive to said magnetometer located in a plane perpendicular to axis of spin of said space vehicle for producing a torque about said axis of spin; and
   a means influencing the response of said electromagnet to said magnetometer system for causing said torque to be produced in an opposite direction; and
   third electromagnet means energized by a replenishable decaying power source located in a plane of said spin axis for orienting said spin axis in response to remotely originated command signals.

2. The spin and attitude control system of claim 1 wherein said third electromagnet means can be energized to create magnetic moments in either of two opposing directions which either aid or oppose the magnetic moment of a permanent magnet located in said spin axis plane.

3. The spin and attitude control system of claim 1 wherein said third electromagnet means for orienting said spin axis is energized by a capacitance power source in response to remotely originated command signals which further control the energization polarity.

4. The spin and attitude control system of claim 1 wherein said magnetometer system comprises a magnetometer sensor and its associated electronic circuitry for producing a signal responsive to the magnetic field strength detected and an amplifier means for amplifying said signal and driving said first electromagnet means.

5. The spin and attitude control system of claim 4 wherein said influencing means comprises circuitry responsive to a command signal for causing a reversal in said signal amplified by said amplifier means.

6. The spin and attitude control system of claim 4 wherein said magnetometer sensor lies along an axis different from the axis of orientation of said first electromagnet means.

7. The spin and attitude control system of claim 6 wherein said influencing means comprises circuitry responsive to a command signal for causing a reversal in said signal amplified by said amplifier means.

8. The spin and attitude control system of claim 4 wherein said magnetometer sensor lies along the same axis as said first electromagnet means.

9. The spin and attitude control system of claim 8 wherein said magnetometer sensor incorporates a magnetic hysteresis material for increasing effectiveness of spin control.

10. The spin and attitude control system of claim 8 wherein said influencing means comprises circuitry responsive to a command signal for causing reversal in said signal amplified by said amplifier means.

11. The spin and attitude control system of claim 8 wherein said remotely originated command signals cause said capacitor to be charged to a predetermined energy level which determines the intensity of the magnetic moment created in the spin axis plane and wherein said command signals control the polarity of said energy supplied to said third electromagnet means by actuating an energy reversal means.

12. The spin and attitude control system of claim 1 wherein said magnetometer system comprises first and second magnetometer sensors oriented so as to be mutually perpendicular and parallel to two axes defining said plane; and associated electronic circuitry for each said first and second megnetometer sensor for producing a signal responsive to the magnetic field strength detected by the respective first and second sensors; and amplifier means for amplifying signals produced by said electronic circuitry and driving respective first and second electromagnet means.

13. The spin and attitude control system of claim 12 wherein said first electromagnet means is oriented so as to be parallel to said first magnetometer sensor and said second electromagnet means is oriented so as to be parallel to said second magnetometer sensor.

14. The spin and attitude control system of claim 12 wherein said first and second magnetometer sensors incorporate magnetic hysteresis material for increasing the effectiveness of spin control.

15. The spin and attitude control system of claim 14 wherein said influencing means comprises circuitry responsive to a command signal for causing a reversal in said signals amplified by said amplifier means.

16. The spin and attitude control system of claim 12 wherein said first electromagnet means is oriented so as to be mutually perpendicular to said first magnetometer sensor and parallel with said second magnetometer sensor; and said second electromagnet means is oriented so as to be mutually perpendicular to said second magnetometer sensor and parallel with said first magnetometer sensor.

17. The spin and attitude control system of claim 16 wherein said amplifier means automatically inverts the signals produced by one of said associated electronic circuits thereby causing said first and second electromagnet means to produce a magnetic moment that is approximately 90° out of phase with earth's magnetic field in said plane.

18. The spin and attitude control system of claim 17 wherein said third electromagnet means for orienting said spin axis is energized by a capacitive discharge power source in response to remotely originated command signals which further control the energizing polarity.

19. The spin and attitude control system of claim 18 wherein said remotely originated command signals cause said capacitor to be charged to a predetermined energy level which determines the intensity of the magnetic moment created in the spin axis plane; and wherein said command signals control the polarity of said energy supplied to said third electromagnet means by actuating energy reversal means.

20. The spin and attitude control system of claim 17 wherein said influencing means comprises circuity responsive to a command signal for causing a reversal in said signals amplified by said amplifier means.

21. The spin and attitude control system of claim 17 further comprising spin rate detecting and safety means for preventing amplification of said signals produced by said asociated electronic circuits when spin rate of said space vehicle exceeds a certain maximum.

22. The spin and attitude control system of claim 17 wherein said third electromagnet means can be energized to create magnetic moments in either of two opposing directions which either aid or oppose the magnetic moment of a permanent magnet located in said spin axis plane.

23. The spin and attitude control system of claim 22 further comprising a magnetometer sensor located in the plane of said spin axis and being responsive to a condition requiring precess control of said spin axis.

References Cited

UNITED STATES PATENTS

| | | | |
|---|---|---|---|
| 3,061,239 | 10/1962 | Rush | 244—1 |
| 3,162,396 | 12/1964 | Rongved et al. | 244—1 |
| 3,190,581 | 6/1965 | Wilson | 244—1 |
| 3,228,628 | 1/1966 | Chubb | 244—1 |
| 3,232,561 | 2/1966 | Adams | 244—1 |

MILTON BUCHLER, Primary Examiner

J. L. FORMAN, Assistant Examiner